AUTOMATIC SOUND VOLUME CONTROLLING SYSTEM
Filed Oct. 18, 1965
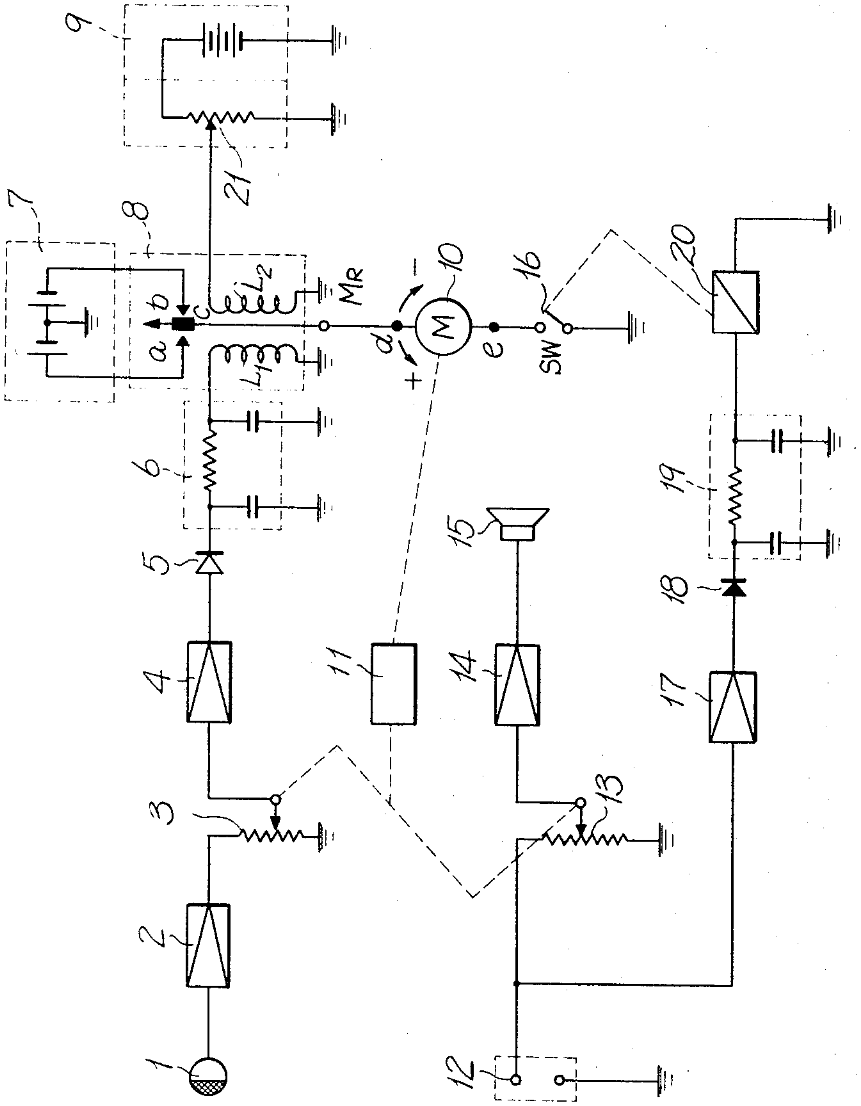

United States Patent Office 3,444,323
Patented May 13, 1969

3,444,323

AUTOMATIC SOUND VOLUME CONTROLLING SYSTEM

Tatsuo Nagashima and Fujio Suganuma, Tokyo, Japan, assignors to TDK Electronics Company, Limited, Tokyo, Japan, a corporation of Japan Filed Oct. 18, 1965, Ser. No. 496,875
Claims priority, application Japan, Nov. 26, 1964, 39/66,727
Int. Cl. H01m *1/02*
U.S. Cl. 179—1 3 Claims

ABSTRACT OF THE DISCLOSURE

An automatic volume control system for a loudspeaker carrying an audio output adjusts the amplification factor of the loudspeaker output in accordance with the noise level at the location of the loudspeaker. A meter type relay element compares a voltage representative of the noise level with a reference voltage and the difference voltage drives a reversible motor in one direction or the other dependent upon the sense of the difference to actuate potentiometers in one sense or the other to effect a change in one direction of the noise level amplification applied to the meter relay and a corresponding change in the opposite direction of the level of the audio input to the loudspeaker. The volume control system is operative only when there is no audio output.

In an automatic sound volume controlling apparatus, there has been used a system of amplifying noises picked up through a sound absorbing microphone and controlling an input such as a musical input into a speaker in accordance with a change in the noise level. However, according to such system, there are defects that, as such signals as musics pronounced from a loud speaker will be also absorbed together with noises through a microphone, with the rise of the noise level, the level of such signals as musics will also rise, therefore a positive return loop will be formed between the sound absorbing microphone and the loud speaker, an oscillation will be produced and the pronouncing level of the speaker will rise to the maximum sound volume and that, even if a signal level canceling circuit is added to prevent it, hunting or the like will be caused, the operation will be unstable, the pronouncing level of the speaker will always fluctuate with the variation of the amount of noises during the broadcasting of musics or the like and the broadcasts will be hard to hear. Thus, such system has been difficult to practice.

The present invention has been suggested to eliminate the above mentioned defects and relates to an automatic sound volume controlling system wherein potentiometers are operatively connected to the shaft of a motor operated by the difference between a noise level and a standard voltage so that, only when such signals as musics are nil or of a slight level, a relay circuit may operate and, when the electric source circuit of said motor is closed, the potentiometers may be rotated in a direction of increasing and decreasing, or decreasing and increasing the inputs of the potentiometer on the sound absorbing microphone side and of the potentiometer on the signal side, respectively, by said motor rotating in the normal or reverse direction in response to the positive or negative polarity of the difference voltage.

A principal object of the present invention is to provide an automatic sound volume controlling system which can positively adjust a sound volume to a sound volume level adapted to the noise level in the field even in case the variation of noises is severe.

The drawing is a block diagram for explaining the automatic sound volume controlling system of the present invention.

The present invention shall now be explained with reference to the accompanying drawing.

First of all, noises absorbed by a sound absorbing microphone 1 will be amplified by an amplifier 2, will have the sound volume adjusted by a potentiometer 3, will be rectified by a rectifier 5 through an amplifier 4 and will be fed to a coil $L_1$ on one side of a meter relay 8 through a time constant circuit 6 of a proper value. A standard voltage to determine a standard level to make a proper sound volume control in response to the noise volume in such case is fed to a coil $L_2$ on the other side of the meter relay by a constant voltage electric source 9 through a potentiometer 21. The contact pointer *c* of the meter relay is connected to one end *d* of the input of a reversible motor 10. Two contact points *a* and *b* are given respective voltages of polarities reverse to each other by an electric source 7. Such signals as musics to be fed to an input terminal 12 will be divided into two parts. One part will have the sound volume adjusted by the potentiometer 13 and will be pronounced from a loud speaker 15 through an amplifier 14. The other part will be amplified by an amplifier 17, will be rectified by a rectifier 18 and will operate a relay 20 through a time constant circuit 19 of a proper value. Said relay 20 is so set that it may control the opening and closing of a switch 16 inserted between the other end *e* of the input to motor 10 and the electric source circuit and may open said switch to be off when said relay 20 operates. Therefore, while such input signals as musics continue, the relay 20 will remain open and the motor 10 will not operate. The shaft of said motor 10 will operatively connect and rotate the sliders of the potentiometers 3 and 13 through a gear mechanism 11 of a proper reduction ratio. The system of the present invention is so made that, for example, in case the contact pointer *c* of the meter relay 8 comes into contact with the contact point *a* side, if the motor 10 rotates in the direction indicated by the arrow +, by the rotation, the slider of the potentiometer 3 may be rotated in the direction of decreasing the input into the amplifier 4 and at the same time the slider of the potentiometer 13 may be rotated in the direction of increasing the input into the amplifier 14 and, on the other hand, in case the contact pointer *c* of the meter relay 8 comes into contact with the contact point *b* side, the motor 10 may rotate in the direction indicated by the arrow —, the slider of the potentiometer 3 may rotate in the direction of increasing the input into the amplifier 4 and at the same time the slider of the potentiometer 13 will rotate in the direction of decreasing the input into the amplifier 14.

Now, in case such input signals as musics come in through the input terminal 12, the signals will pass through the amplifier 17, will operate the relay 20 and will open the switch 16 and, therefore, the motor 10 will not operate and will not rotate. This state will be kept while the signals continue. Then, when the signals are interrupted, the relay 20 will return to the original position, the switch 16 will close to be on, the contact pointer *c* of the meter relay 8 will come into contact with the contact point *a* or *b* and the motor 10 will be able to rotate in the normal or reverse direction.

On the other hand, in case the voltage obtained by the noise absorbed by the sound absorbing microphone 1 and impressed on the coil $L_1$ on one side of the meter relay 8 is lower than the standard voltage impressed on the coil $L_2$ on the other side of said meter relay 8, the contact pointer *c* of the meter relay 8 will come into contact with the contact point *b* side, therefore the motor 10 will rotate in the direction indicated by the arrow —, thus the potentiometer 3 will rotate in the direction of increasing the input into the amplifier 4 and at the same time the potentiometer 13 will rotate in the direction of decreasing the input into the amplifier 14, and, when the voltages on both sides of the meter relay 8 have become equal to each other, the contact pointer *c* of the meter relay 8 will separate from the contact point *b* and will become neutral, the electric source of the motor 10 will be cut off and therefore the rotation of said motor will stop. The potentiometer 21 is adjusted and the standard level is determined so that, in such state, the sound volume may be optimum in relation to the noise volume. Further, in case the noise level is higher than the standard voltage, the contact pointer *c* of the meter relay 8 will come into contact with the contact point *a*, the motor 10 will rotate in the direction indicated by the arrow + and the potentiometer 3 will be rotated until the voltage impressed on the coil $L_1$ on one side of the meter relay 8 becomes equal to the standard voltage impressed on the coil $L_2$ on the other side and will stop when they have become equal to each other. At the same time, by rotating the potentiometer 13 in the direction of increasing the output, the signal output from the speaker will be increased to the sound volume optimum to the noise volume.

As in the above, in the automatic sound volume controlling system of the present invention, the standard level predetermined to be an optimum level in the sound field and the noise level obtained by the sound absorbing microphone amplifying system are compared with each other by a comparing circuit using a meter relay or the like and, in case said noise level is higher than the standard level, a sound volume adjuster in the sound absorbing microphone amplifying system will be operated in the direction of decreasing the input into the comparing circuit and, at the same time, the sound volume adjuster in the signal amplifying system will be operated as operatively connected with it so that the pronouncing level of the speaker may increase and will be operated until the standard level and the noise level in the comparing circuit become equal to each other and, on the other hand, in case the noise level is lower than the standard voltage, said sound volume adjuster will be operated so as to increase the input into the comparing circuit and to reduce the pronouncing level of the speaker and, by providing a switch circuit which will operate only when the signals pronounced in the sound field from the loud speaker have become nil or have become so negligible as to have no bad influence on the operation or, in other words, only when there exists in fact only noises in the sound field, the sound volume can be positively adjusted to a sound volume level adapted to the noise level in the field and such various defects seen in the conventional system as are described first are perfectly eliminated. The system of the present invention can be used in such places where the variation of noises is large as, for example, on the platforms of stations and in trains, lecture meeting places and tea houses. Its range of application is very wide.

What is claimed is:

1. In an automatic volume control system for a loudspeaker carrying an audio output the combination comprising a source of audio input for said loudspeaker, a first potentiometer connected between said source and the input to said loudspeaker for controlling the output volume, a microphone for picking up random noise, a meter type relay including first and second coils and a pointer element actuated thereby whose sense and magnitude of movement are determind by the sense and magnitude respectively of the difference in current flows through said coils, circuit means including a second potentiometer for applying a first voltage to said first meter coil in proportion to the electrical output from said microphone, circuit means for applying an adjustable standard voltage to said second meter coil, a reversible motor controlled by said meter relay, said motor being rotated in one direction when the difference in current flows through said meter coils exceeds a predetermined amount in one sense and being rotated in the opposite direction when the difference in current flows through said meter coils exceeds a predetermined amount in the opposite sense, and means coupling the drive from said motor to said first and second potentiometers to increase the output from said first potentiometer and simultaneously decrease the output from said second potentiometer when the current flow through said first meter coil is less than the current flow through said second meter coil, or alternatively to decrease the output from said first potentiometer and simultaneously increase the output from said second potentiometer when the current flow through said first meter coil is greater than the current flow through said second meter coil, and means enabling energization of said motor for rotation in either direction only when the audio output from said speaker ceases.

2. An automatic volume control system as defined in claim 1 wherein said meter pointer includes a contact movable between a pair of stationary contacts, a voltage source of one polarity connected to one of said stationary contacts, a voltage source of the opposite polarity connected to the other stationary contact and circuit means connecting said pointer contact to said motor to control the direction of its rotation in accordance with the polarity of the voltage applied thereto.

3. An automatic volume control system as defined in claim 2 wherein said means for enabling energization of said motor for rotation in either direction only when the audio output from said loudspeaker has ceased is comprised of switch means located in the motor circuit, and means controlling the operation of said switch means in accordance with the output from said audio input source.

References Cited

UNITED STATES PATENTS

| | | | |
|---|---|---|---|
| 2,486,480 | 11/1949 | Kimball et al. ------- | 179—1.8 |
| 2,668,874 | 2/1954 | Augustadt et al. ------ | 179—1.8 |

KATHLEEN H. CLAFFY, *Primary Examiner.*

VAN C. WILKS, *Assistant Examiner.*